(12) United States Patent
Regan et al.

(10) Patent No.: US 7,944,611 B1
(45) Date of Patent: May 17, 2011

(54) HIGH ZOOM RATIO OPTICAL SIGHTING DEVICE

(75) Inventors: Rick R. Regan, Aloha, OR (US); Brad Brumfield, Hillsboro, OR (US)

(73) Assignee: Leupold & Stevens, Inc., Beaverton, OR (US)

( * ) Notice: Subject to any disclaimer, the term of this patent is extended or adjusted under 35 U.S.C. 154(b) by 122 days.

(21) Appl. No.: 12/414,573

(22) Filed: Mar. 30, 2009

Related U.S. Application Data

(60) Provisional application No. 61/040,665, filed on Mar. 29, 2008.

(51) Int. Cl.
*G02B 23/00* (2006.01)

(52) U.S. Cl. ............... 359/422; 42/119; 359/432

(58) Field of Classification Search .......... 359/422–424, 359/434–435, 432; 42/119
See application file for complete search history.

(56) References Cited

U.S. PATENT DOCUMENTS

| | | | | |
|---|---|---|---|---|
| 936,541 A * | 10/1909 | Kellner | ................. | 359/422 |
| 2,155,389 A | 4/1939 | Arden | | |
| 2,454,686 A * | 11/1948 | Back | ................. | 359/432 |
| 2,970,516 A * | 2/1961 | Back et al. | ................. | 359/677 |
| 2,997,916 A * | 8/1961 | Friedman et al. | ................. | 359/424 |
| 3,010,367 A * | 11/1961 | Miles | ................. | 359/402 |
| 3,011,403 A * | 12/1961 | Dlutzik | ................. | 359/418 |
| 3,058,391 A | 10/1962 | Leupold | | |
| 3,184,852 A | 5/1965 | Hageman | | |
| 3,297,389 A | 1/1967 | Gibson | | |
| 3,970,366 A * | 7/1976 | Sekiguchi | ................. | 359/683 |
| 4,033,674 A * | 7/1977 | Sekiguchi | ................. | 359/693 |
| 4,249,793 A * | 2/1981 | Uehara | ................. | 359/422 |
| 4,395,096 A | 7/1983 | Gibson | | |
| 4,408,842 A | 10/1983 | Gibson | | |
| 4,806,007 A | 2/1989 | Bindon | | |
| 4,909,614 A * | 3/1990 | Itoh et al. | ................. | 359/683 |
| 5,576,888 A | 11/1996 | Betensky | | |
| 5,576,892 A * | 11/1996 | Hotta et al. | ................. | 359/696 |
| 6,226,122 B1 | 5/2001 | Sugawara | | |
| 6,816,305 B2 | 11/2004 | Regan et al. | | |
| 7,224,535 B2 * | 5/2007 | Neil | ................. | 359/683 |
| 7,230,756 B2 * | 6/2007 | Hoogland | ................. | 359/435 |
| 2002/0089742 A1 | 7/2002 | Otteman | | |

* cited by examiner

*Primary Examiner* — Mark Consilvio
(74) *Attorney, Agent, or Firm* — Stoel Rives LLP

(57) ABSTRACT

An optical sighting device having a compound zoom system preferably includes two or more lens erector assemblies that are each adjustable to modify the optical power of the optical sighting device. A prism erector assembly may also be included. An odd number of erector assemblies preferably creates a viewable image that has the same orientation as the real object being viewed through the optical sighting device.

18 Claims, 7 Drawing Sheets

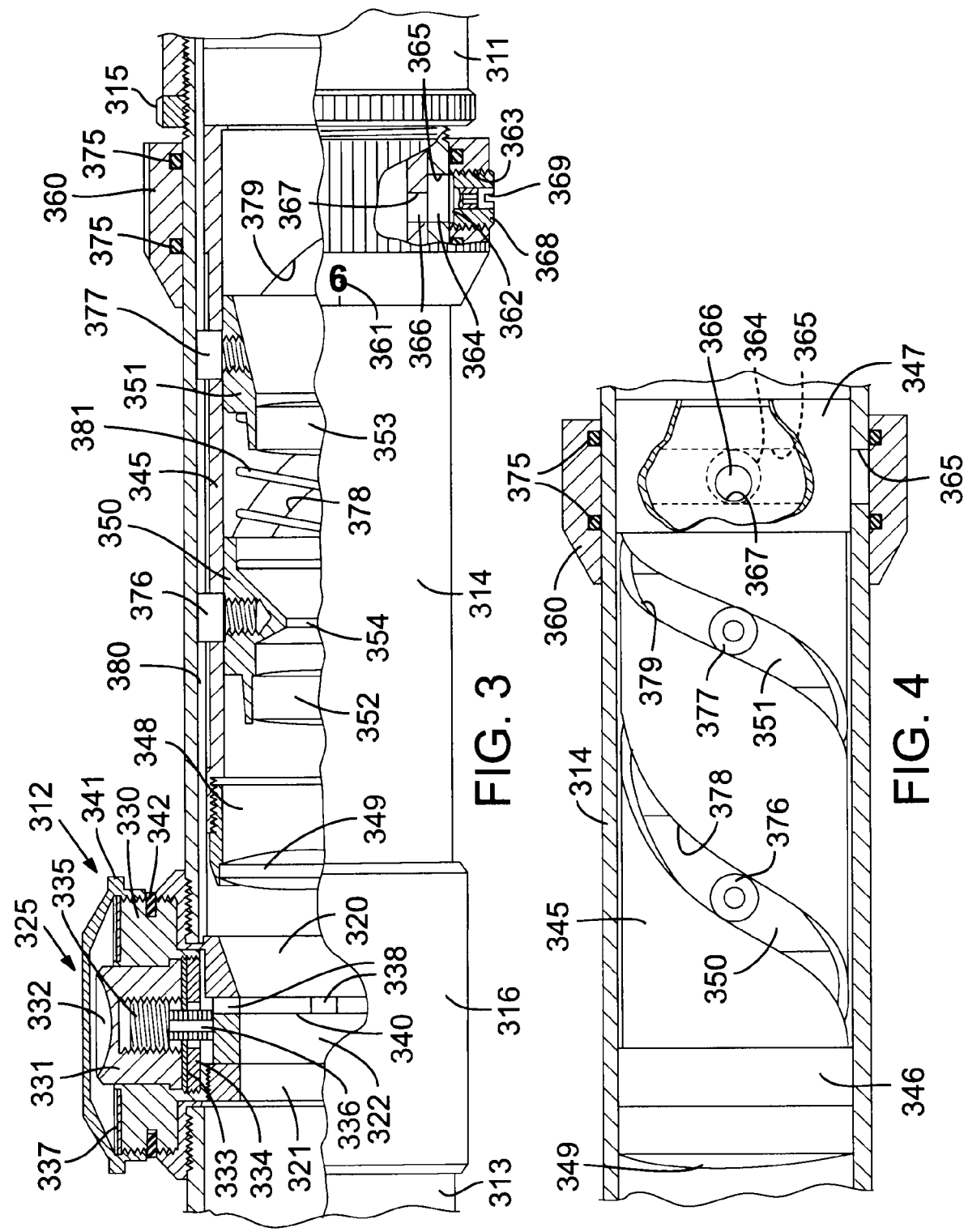

HIGH ZOOM RATIO OPTICAL SIGHTING DEVICE

RELATED APPLICATIONS

This application claims priority under 35 U.S.C. §119(e) to U.S. Provisional Patent Application No. 61/040,665, which was filed on Mar. 29, 2008, and is fully incorporated herein by reference.

TECHNICAL FIELD

The field of the present disclosure relates to optical sighting devices, and in particular to optical sighting devices including a compound zoom system.

BACKGROUND

Conventional riflescopes and other optical sighting devices often include an objective, commonly a lens or group of lenses, that creates within a sighting device an inverted, or upside-down, image of a real object. An erector system, such as an image-erecting lens group, prism, or set of mirrors, positioned between the ocular and the objective is also often included in such sighting devices. A primary purpose for including an erector system in an optical device is to invert, or flip, the image created by the objective so the real image viewed by a user has the same orientation as the real object.

In some such sighting devices, erector lens elements are movable longitudinally along the optical axis for varying an optical power (magnification) of the sighting device. One such system is described in U.S. Pat. No. 3,058,391 of Leupold. Varying the magnification of the image viewed by the user may make an optical device easier to use, and may provide use of the optical device in a wider range of applications than if the optical power could not be altered. For example, when a user of binoculars, a riflescope, a spotting scope or other suitable optical sighting device scans a distant scene for a particular object, a lower level of optical power provides a wider field of view than a higher magnification device does. In other words, more of the distant scene appears to a user of the optical sighting device at a low magnification. Using a lower magnification setting permits the user to rapidly scan the distant scene to locate the particular object, such as a deer. Once the user locates the particular object and views the object through the optical sighting device, increasing the magnification permits a more detailed view of the object without the need to reacquire the object's position in the distant scene.

Many riflescopes and other optical devices utilizing movable erector lenses for adjusting the optical power of the device may be limited to a zoom ratio of around 4:1 or less, and often close to, or less than 3:1. For example, a variable-power riflescope may have a magnification ranging between 3× and 9× for a zoom ratio of 3:1 (sometimes referred to as a 3× zoom), which means that a distant object appears between three times closer than it actually is to nine times closer than it actually is depending on where the user sets the magnification.

Some riflescopes may have a zoom ratio of around 10:1, but 10:1 appears to be the upper limit zoom ratio for current riflescopes and other optical sighting devices. There are several factors that may limit how high of a zoom ratio current optical sighting devices may have. For example, the range of travel the optical elements may need to traverse for a zoom ratio greater than 10:1 may require a zoom ring that rotates more than 180 degrees. However, designing a zoom ring with more than 180 degrees of rotation may require cutting a large arc from a scope tube that weakens the scope tube.

Another example may be the difficulty of designing a set of cams to move the lenses in an erector for a zoom ratio greater than 10:1. Because the lenses are likely to require a large range of travel and a zoom ring is likely to be limited to 180 degrees, or less, of rotation, the cam profiles may be relatively steep and be prone to binding an erector element instead of moving it. Another likely limiting factor may be the need to incorporate a gear box or other mechanism to provide the needed travel for the erector elements, which would add complexity and cost to an optical sighting device. Another potential problem for current optical sighting devices attempting to include a relatively high zoom ratio, such as 8:1 or greater, may be vignetting, which is a dark ring appearing around the image viewed through the optical sighting device that often reduces the field of view.

SUMMARY

The present disclosure relates to optical sighting devices including a compound zoom system. Including a compound zoom system may permit an optical sighting device to have a zoom ratio greater than 10:1, while keeping the length of the optical sighting device at or under 350 millimeters. One embodiment of the zoom system employs two adjacent power-varying lens erector systems in conjunction with a prism erector. In one configuration, the system includes two or more zooming lens erector systems in a sighting device. In another configuration, the system uses a zooming lens erector system in conjunction with a prism erector.

Placing the prism erector assembly in the correct location relative to a reticle allows windage or elevation adjustments, or both, to be made by moving the prism. Windage or elevation adjustments can be accomplished by translating the prism in the vertical and horizontal direction or rotating the prism about vertical and horizontal axes.

One potential advantage of including a compound zoom system is that a magnification ratio of greater than 10:1 may be achieved. Another potential advantage is that an optical sighting device that includes a compound zoom system may operate as two optical sighting devices in a single package by independent operation of each zoom arrangement in the compound zoom system. For example, a single riflescope may be used as a 10:1 zoom rifle scope by operating one of two zoom arrangements, and as a 20:1 zoom riflescope by operating both zoom arrangements, for example, a 10:1 zoom erector in conjunction with a 2:1 zoom erector. Additional aspects and advantages will be apparent from the following detailed description of preferred embodiments, which proceeds with reference to the accompanying drawings.

BRIEF DESCRIPTION OF THE DRAWINGS

FIGS. 3 and 4 represent an exemplary cam tube arrangement.

DETAILED DESCRIPTION OF PREFERRED EMBODIMENTS

Figure 1:
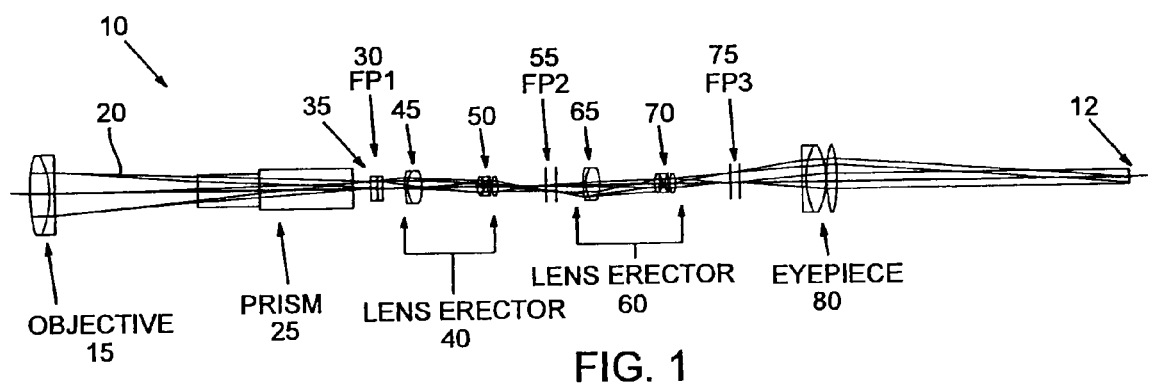
FIG. 1 is a schematic illustration for an optical layout for a sighting device.

FIG. 1 is a diagrammatic optical layout of a sighting device 10 according to one embodiment. Though the sighting device 10 depicted in FIG. 1 is described with respect to a particular riflescope, other embodiments may include any type of riflescope, spotting scope, binocular, telescope, or other similar observation or sighting optic. The sighting device 10 includes an objective lens 15 through which a light bundle 20 passes. The light bundle 20 carries an image of a real object. Because of the prescription of the objective 15, the image carried by the light bundle 20 becomes inverted within the sighting device 10.

A prism erector assembly 25 is positioned between the objective 15 and a first focal plane 30. Preferably, the first focal plane 30 is located 5 to 6 millimeters behind the prism erector assembly 25 in a direction away from the objective 15. Placing the prism erector assembly 25 proximate the objective 15 preferably folds the optical path through the sighting device 10, thus reducing the overall length of the optical sighting device 10. The prism erector assembly 25 re-orients the image carried by the light bundle 20 so that an image created at the first focal plane 30 has the same orientation as the real object. The prism erector assembly 25 is preferably a Schmidt-Pechan prism assembly, however the prism erector assembly 25 may comprise any suitable type of image-erecting prism assembly, including, but not limited to, other roof prism and helper prism assemblies.

A reticle 35 is located at the first focal plane 30. However, the reticle 35 may be located at one of the other focal planes described below. Moving the prism erector assembly 25 transverse to the optical axis 12 adjusts the position of the reticle as viewed on the image projected through the sighting device 10.

The sighting device 10 includes a first lens erector system 40 which includes a focusing lens, or group of lenses, 45 and a magnifying lens, or group of lenses, 50. Both the focusing lens 45 and the magnifying lens 50 are moveable along the optical axis 12 as described below. Moving the magnifying lens 50 along the optical axis 12 adjusts the optical power of the sighting device 10, that is, increases or decreases the apparent size, or closeness, of the image viewed through the sighting device 10. Moving the focusing lens 45 in conjunction with the magnifying lens 50 retains the front conjugate, or focal distance, of the erector system 40 at or near the first focal plane 30. Moving the focusing lens 45 in conjunction with the magnifying lens 50 also retains the rear conjugate, or focal distance, of the erector system 40 at or near a second focal plane 55. The focusing lens 45 and the magnifying lens 50 often move with respect to each other, that is, the distance between the focusing lens 45 and the magnifying lens 50 often changes as they move. The first lens erector system 40 also re-orients the image carried by the light bundle 20 so that an image created at the second focal plane 55 has the opposite orientation, that is, is inverted and flipped left-to-right, as compared to the real object.

The sighting device 10 also includes a second lens erector system 60 which includes a focusing lens, or group of lenses, 65 and a magnifying lens, or group of lenses, 70. Both the second focusing lens 65 and the second magnifying lens 70 are moveable along the optical axis 12 and function to adjust the optical power of the sighting device 10 and to maintain the front conjugate, or focal distance, of the erector system 60 at or near the second focal plane 55 and to maintain the rear conjugate, or focal distance, of the erector system 60 at or near a third focal plane 75. The second lens erector system 60 also re-orients the image carried by the light bundle 20 so that an image created at the third focal plane 75 has the same orientation as the real object. An ocular 80 presents the image carried by the light bundle 20, which has the same orientation as the real object, to a user. The reticle 35 may be located at first focal plane 30, second focal plane 55, or third focal plane 75.

The first lens erector system 40 and the second lens erector system 60 share a common conjugate located at, or proximate, the second focal plane 55, regardless of whether the first lens erector system 40 and the second lens erector system 60 have identical or different zoom ratios. Specifically, the rear conjugate of the first lens erector system 40 coincides with the front conjugate of the second lens erector system 60.

First lens erector system 40 and second lens erector system 60 thus include multiple lenses that are moved along an optical axis 12 of sighting device 10 to achieve optical zoom, that is, a range of optical power (magnification), that is greater than the range of magnification that either the first erector system 40 or the second erector system 60 provides individually. In one embodiment, current lens prescriptions (including prescriptions for the erector lenses, the objective lens, and the ocular lens) can be used instead of creating custom lens prescriptions to obtain a high zoom ratio. When existing erector lens arrangements are used, using two different erector assemblies, such as an erector assembly with a zoom ratio of 4:1 and an erector assembly with a zoom ratio of 5:1, may help correct for optical aberrations. For example, each erector assembly may create different optical aberrations, and those aberrations may counter, or partially counter, each other. In other embodiments, custom prescriptions may be used for the erector lenses, the objective lens, or the ocular lens, singularly or in any combination.

First lens erector system 40 and second lens erector system 60 may have identical or different designs. For example, first lens erector system 40 and second lens erector system 60 may each provide variable optical power (magnification) and a zoom ratio of approximately 3:1, which enables a total zoom ratio of approximately 9:1 for sighting device 10. Alternatively, first lens erector system 40 may have a zoom ratio of approximately 4:1, and second lens erector system 60 may have a zoom ratio of approximately 5:1, for a total compound zoom ratio of approximately 20:1 for sighting device 10.

Unlike large zoom range systems found in some camera lenses, the compound zoom system according to certain embodiments preferably produces an upright image, making it suitable for optical sighting devices, such as riflescopes and spotting scopes, for example. The compound zoom system preferably provides zoom ranges that are otherwise not achievable in an acceptable sized package for sighting devices. For example, using two 3:1 zoom lens erector systems results in a 9:1 zoom system in an optical device with an overall length less than 320 mm. Examples of possible magnification ranges in this case would be 1× to 9× and 3× to 27×, for example.

Moving the magnification lenses in a lens erector assembly with a power selector is now described. Power selectors are most commonly a ring encircling a portion of an optical sighting device and mechanically coupled to move a lens inside the sighting device when the ring is rotated, but other suitable power selectors may be used. In a preferred embodiment, illustrated in FIG. 2, a sighting device 100 includes two lens erector assemblies 105 and 110. Each lens erector assembly 105 and 110 is mechanically coupled to a power selector 115 and 120, respectively. Power selectors 115 and 120 include rings 116 and 121 encircling the sighting device 100, and each ring 116 and 121 is mechanically coupled to the sighting device 100 in a manner that permits the power selectors 115 and 120 to rotate about the sighting device 100. Each power selector ring 116 and 121 includes a pin 125 and 130 extending inwardly from the ring 116 and 121 and through housing 102 to engage slots in cam tubes 135 and 140, respectively. The cam tubes 135 and 140 each surround a guide tube 145 and 150, and each guide tube is non-rotatably retained within the sighting device 100, for example, by a press fit with the housing 102, by glue or other suitable adhesive, by a threaded engagement, or other suitable manner. Focusing lenses 155 and 160 and magnifying lenses 165 and 170 are preferably housed in carriages 175, 180, 185, and 190. The carriages 175, 180, 185, and 190 include guide pins 177, 182, 187, and 192 that engage longitudinal guide slots 195 and 200 in the guide tubes 145 and 150. The guide pins 177, 182, 187, and 192 also engage cam slots 136, 137, 141, and 142 in the cam tubes 135 and 140. The guide slots 195 and 200 are preferably straight, while the cam slots 136, 137, 141, and 142 are preferably helically-shaped.

An exemplary power selector and cam tube arrangement is described in U.S. Pat. No. 3,058,391 of Leupold. While U.S. Pat. No. 3,058,391 describes a single power selector and cam tube arrangement as follows, it is understood that described, as well as other, embodiments utilize two or more such, or similar, zoom selector and cam tube arrangements.

As seen in FIGS. 3 and 4, each such adjusting means comprises an externally threaded member 330 which screws into an internally threaded well in the barrel 316, and which is provided with a concentric flange projecting through an opening in the barrel. The member 330 is provided with a concentric central bore in which there is mounted an adjusting turret 331 provided with a transverse groove 332 at its upper end. The lower end of the turret 331 is provided with an external flange which engages a countersunk portion of the bore in the member 330, so that the turret 331 and a locking ring 333 seated thereon may be held in position by a threaded member 334 screwed into the lower end of the bore. The turret 331 is provided with a central, downwardly opening socket, the major portion of which is internally threaded and mounts an adjusting screw 335. The locking ring 333 is keyed to the member 330 (not shown) and a tongue thereon engages a vertical slot 336 in a cylindrical extension of the screw 335. Therefore, when the turret 331 is engaged by a screwdriver or coin and partially rotated, the adjusting screw 335 is prevented from rotation but moves longitudinally toward and away from the axis of the scope. The adjusting turret 331 is provided with a pointer (not shown) and the surface of the member 330 mounts a fixed scale 337, whereby the extent of adjusting movement in either direction may be measured. The two adjusting screws 335 bear on the reticle mounting ring 322 at 90° to each other, and spring means (not shown) mounted between the barrel 316 and the ring 322 hold the ring firmly against the two screws, so that the reticle ring follows the movements of the adjusting screws. One edge of the reticle mounting ring 322 is provided with notches 338 which hold the ends of the filaments of the reticle 340. A gas impervious cap 341 is threaded onto the upper end of the member 330 and the lower edge thereof engages a resilient gasket 342 mounted in and projecting outwardly from an external groove in the member 330, so that the outer peripheral portion of the gasket may be clamped between the portion of barrel 316 surrounding the member 330 and the lower edge of the cap 341. Loss of an inert gas charge through the adjusting means and ingress of water vapor is thereby prevented or held to an insignificant minimum.

The rifle scope is adapted to be mounted in relatively fixed position upon a rifle, the usual such means comprising a pair of mounting bands (not shown) mounted on the rifle and firmly gripping the barrel portions 313 and 314. As a result of the mounting arrangement, the outer tube portion 314 is fixed in use. Accordingly, an inner tube 345 is movably mounted within outer tube portion 314 and inner tube 345 has a slightly lesser external diameter than the internal diameter of the tubular portion 314 except for snugly fitting lands 346 and 347 at front and rear for maintaining the two tubes in concentric relation without excess friction. The inner tube mounts a field lens assembly 348, including a field lens 349 at its forward end in proximity to the reticle 340. A pair of erector lens assemblies 350 and 351 are mounted concentrically in snug fitting relationship within the inner tube 345, the assemblies respectively comprising erector lenses 352 and 353 in longitudinally spaced relation along the inner tube 345. Each erector lens assembly is slidably guided for movement longitudinally of the inner tube, and is relatively rotatable with respect thereto, being held against rotation, by means to be described, as the inner tube 345 is rotated by means to be described.

It is to be appreciated that all of the lens assemblies and the reticle are optically aligned along the optical axis of the rifle scope, and are so related to each other that an image of an objective is created at the plane of the reticle for rifle sighting purposes. The field lens 349 gives a magnified image of the erected image created by the erector lenses as is usual in such assemblies, and a field masking flange 354 in the erector lens assembly 350 limits the field of view in a conventional manner. A power adjusting band 360 having an externally ribbed surface is concentrically mounted upon the end of the outer tube 314 adjacent the lock nut 315. The adjusting ring is provided with graduations and numerals 361 which may be rotated past a fixed indicator (not shown) on the external surface of the tube portion 314 adjacent thereto, whereby the desired magnification power may be selected. Connecting means for uniting the power adjusting band 360 and the inner tube 345 are provided, comprising a connecting member having an outer, cylindrical head portion 362 seated in an internally threaded socket 363 in the band 360, an intermediate concentric cylindrical portion 364 which passes through a partially circumferential slot 365 in the fixed tubular portion 314, and an inner eccentric portion 366 which is snugly seated in a cylindrical bore 367 in one end of the inner tube 345. The portion 364 has substantially the same diameter as the width of the slot 365, so that the adjusting band and the outer tube 314 are held in longitudinally fixed relation to each other. The slot 365 extends circumferentially around the outer tube 314 for approximately 180° in a scope having variable power from about three to about nine. The slot 365 limits manual adjusting rotation of the adjusting band 360.

The cylindrical head portion 362 of the connecting member is relatively thin and seats in the bottom of the socket 363. The threaded outer portion of the socket 363 holds a locking plug 368 which may be tightened or loosened by means of a screwdriver or coin engaged in a cross slot 369 in its outer surface. The plug 368 is also provided with a central bore 370 extending therethrough, so that when the locking plug is slightly loosened the connecting member may be rotated by means of an hexagonal bar inserted through the bore 370 and engaging an hexagonal socket 371 in the outer end of the connecting member. The eccentric portion 366 may therefore be moved longitudinally within the limits permitted, so as to initially adjust the relative longitudinal position of the inner tube 345. Tightening of the plug 368 thereafter clamps the connecting member in adjusted position, and the inner tube is thus held in longitudinally fixed relation to the tubular assembly.

A pair of circumferentially extending sealing rings 375 are mounted internally of the adjusting band 360 in grooves provided for the purpose, the sealing rings 375 projecting slightly inwardly of the inner surface of the adjusting band and being thereby compressed and maintained in gas sealing engagement with the outer surface of the fixed tube portion 314. The sealing rings 375 lie on opposite sides of the slot 365, thereby maintaining the gas charge and preventing moisture ingress. The sealings rings 375 also frictionally resist rotation of the band 360, so that a desired magnification may be held during use of the rifle scope.

Each of the erector lens assemblies includes a guide pin 376 and 377, respectively, which guide pins project radially outward from their respective erector lens assemblies and are engaged in snugly fitting helical grooves 378 and 379, respectively, in the inner tube 345. The slots 378 and 379 are longitudinally aligned with each other and with the slot 365. The pins 376 and 377 project beyond the inner tube and into a longitudinal groove 380 in the inner surface of the fixed outer tube portion 314, The guide pins 376 and 377 are thus maintained in longitudinal alignment with each other at all times, holding the pair of erector lens assemblies against rotation while the inner tube may be rotated about them by manipulation of the adjusting band 360. The guide pins engaging the helical slots 378 and 379, respectively, cause the erector lens assemblies to move longitudinally of the tube as the adjusting band 360 is manipulated. The relative pitches and locations of the helical slots 378 and 379 are mathematically designed to maintain correct optical relation of the erecting lenses to each other and to the remainder of the rifle scope so that a clear, sharp image of the objective is created at the plane of the reticle regardless of the degree of magnification effected by manipulation of the adjusting band 360.

A helical spring 381 is compressed between the erector lens assembly 350 and the erector lens assembly 351, the spring being under compression regardless of how far apart the erector lens assemblies may be separated. The spring eliminates any play or backlash in the movements of the erector lens assemblies whereby to maintain sharp definition of the image.

The pins 125 and 130 mechanically couple the rings 116 and 121 to the cam tubes 135 and 140, thus transferring rotational energy imparted to the rings 116 and 121 to the cam tubes 135 and 140. When cam tubes 135 and 140 rotate, the guide pins 177, 182, 187, and 192, and thus the carriages 175, 180, 185, and 190, are moved in a linear fashion along the optical axis 205 because of the forces imparted by the rotating cam slots 136, 137, 141, and 142 and the stationary guide slots 195 and 200. In the embodiment illustrated, the power selectors 115 and 120 are not coupled to each other, and the cam tubes 135 and 140 are not coupled to each other, therefore each lens erector assembly 105 and 110 is independently adjustable. That is, a user may adjust the magnification of the sighting device 100 by moving power selector 115, by moving power selector 120, or by moving both.

While a particular power selector has been described, power selectors are generally known in the art, and any suitable power selector may be used. Likewise, mechanical coupling devices for connecting power selectors to optical sighting devices and to magnification lenses are generally known in the art, and any suitable mechanical couple may be used.

Figure 2:
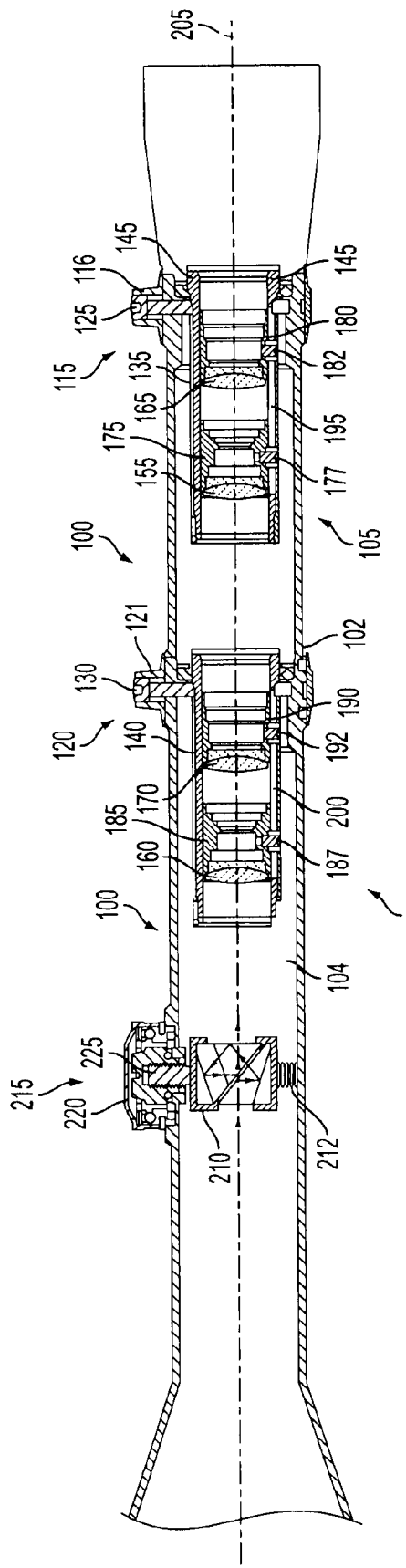
FIG. 2 is a sectional view of a preferred embodiment.
Figure 5:
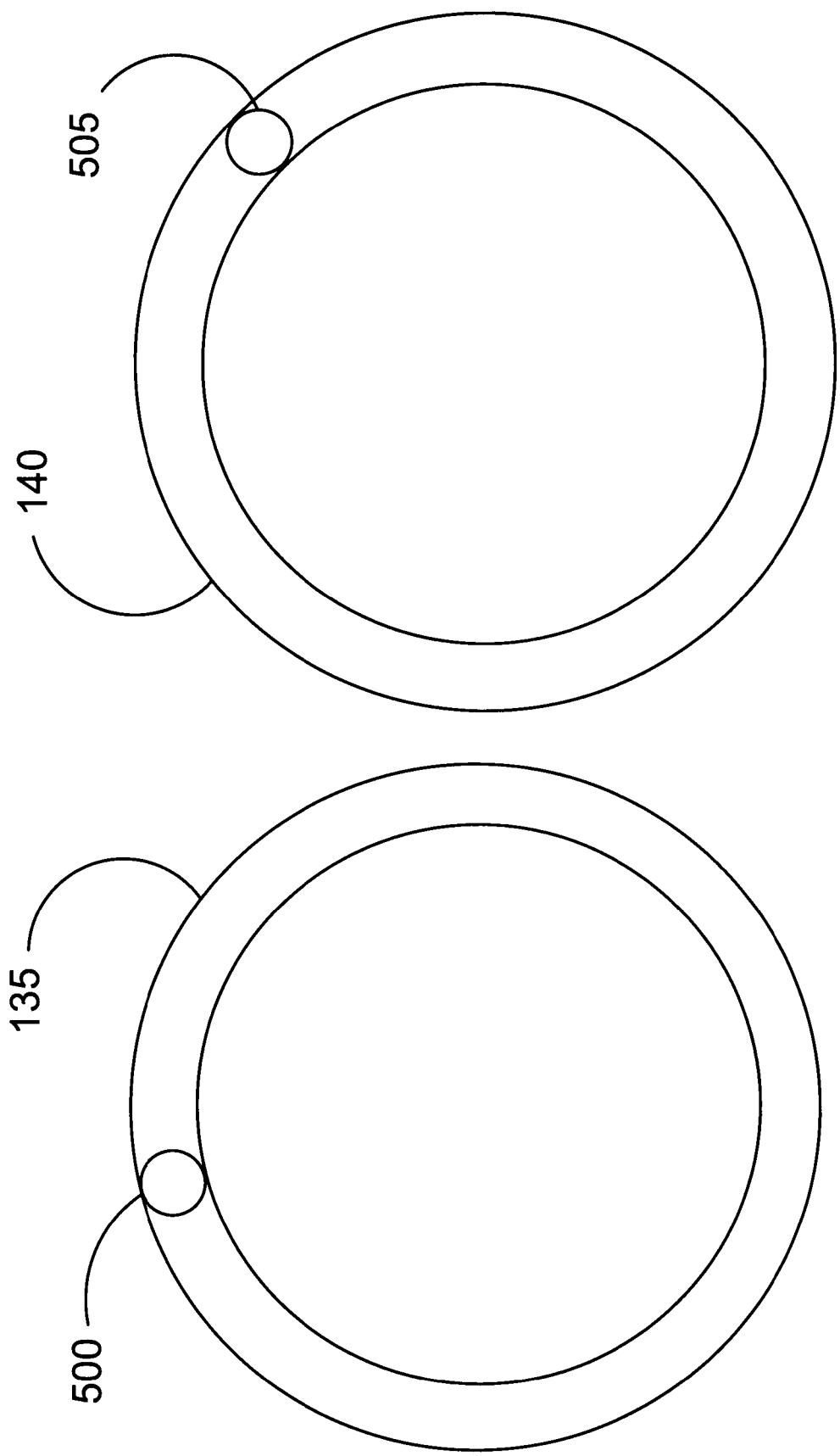
FIG. 5 is a schematic illustration of engaging surfaces for two cam tubes.

Alternative power selectors may be used to move the lenses in lens erector assemblies in different manners. One power selector may move the lenses in a first lens erector assembly, and then may be used to move the lenses in a second lens erector assembly once the lenses in the first lens erector assembly reach their limit of travel. For example, cam tubes 135 and 140 could be located on a single guide tube instead of on two guide tubes as illustrated in FIG. 2. Drive pins 300 and 305 (FIG. 5) located at the facing ends of the cam tubes 135 and 140 may mechanically couple the cam tubes 135 and 140 together. When cam tube 135 is rotated one revolution by a power selector, the focus lens 155 and the magnifying lens 165 preferably reach the limit of their travel. As the power selector continues to rotate the cam tube 135, pin 500 engages pin 505 and causes the cam tube 140 to begin rotating, thus driving the focus lens 160 and the magnification lens 170. When operated in the opposite direction, a cam, ratchet, or other suitable selector, preferably causes the power selector to rotate the cam tube 140 in the opposite direction, thus disengaging pin 500 from pin 505. When the cam 140 has driven the focus lens 160 and the magnification lens 170 to the limit of their travel, pins 500 and 505 reengage to permit the power selector to drive the cam tube 135. Another power selector may move the lenses in a first lens erector assembly and the lenses in a second lens erector assembly at the same, or substantially the same, time. For example, cam tube 135 and cam tube 140 could be joined to form a single cam tube. Other suitable arrangements of power selectors, cam tubes, and guide tubes may be used, as well as mechanical arrangements that do not use cam tubes, guide tubes, or both.

Windage and elevation adjustment are now described. In many current riflescopes, elevation and windage adjustment is typically accomplished by laterally moving the erector lens system within an outer housing. The erector lens system is mounted to a pivot tube within the housing that is pivotably connected to the housing at one end of the pivot tube. Tilting the pivot tube relative to the scope housing causes the erector lenses to be shifted laterally, which diverts the optical path of the observed light before it reaches the reticle, as described for example in U.S. Pat. No. 4,408,842 of Gibson. In prior sighting devices, the amount of angular aiming adjustment for windage and holdover is typically limited by the space available within the housing for lateral movement of the reticle (as in U.S. Pat. No. 3,058,391) or pivotal movement of the pivot tube (as in U.S. Pat. No. 4,408,842). The compound zoom scope described herein could be designed to include such capability, however it would require a larger diameter main tube than a system in which the prism is tilted or translated to adjust windage and elevation.

A prism or lens erector assembly may be pivoted, preferably using the rear focal point as the pivot axis. An exemplary pivot tube arrangement is described in U.S. Pat. No. 6,469,829 of Otteman and assigned to Leupold & Stevens, Inc., the assignee of the present application. The exemplary pivot tube arrangement is as follows.

Figure 6:
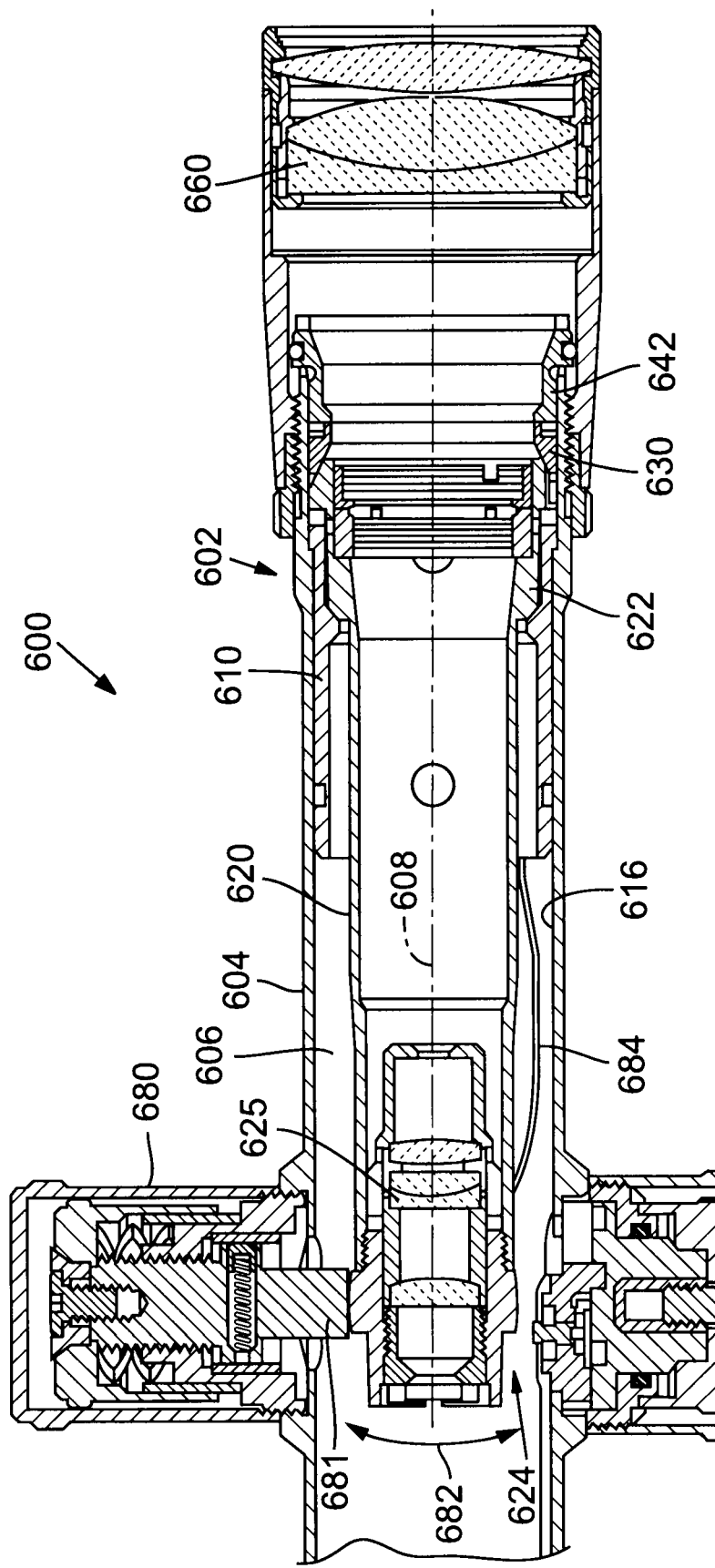
FIGS. 6-8 represent an exemplary pivot tube arrangement.
Figure 7:
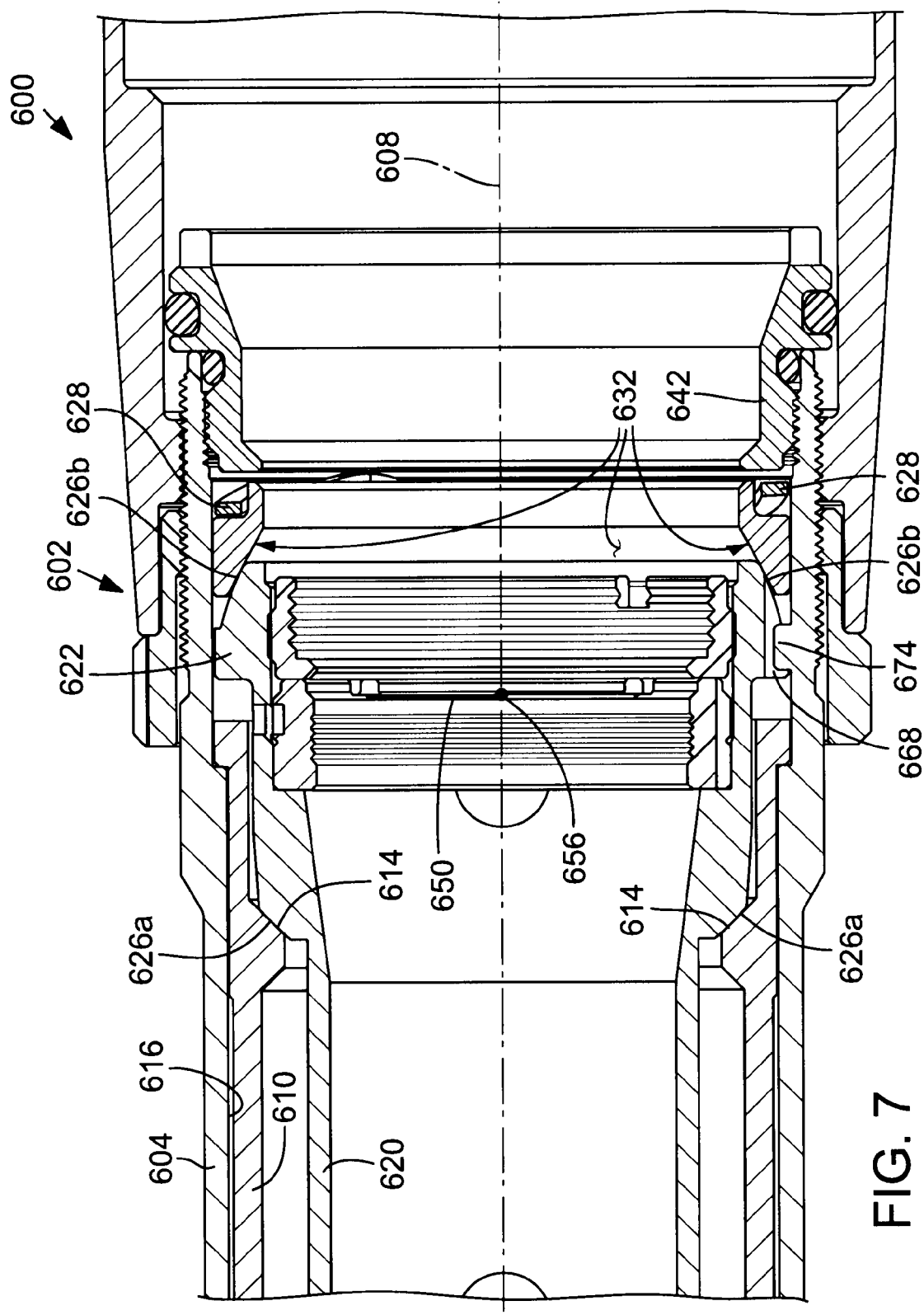
Figure 8:
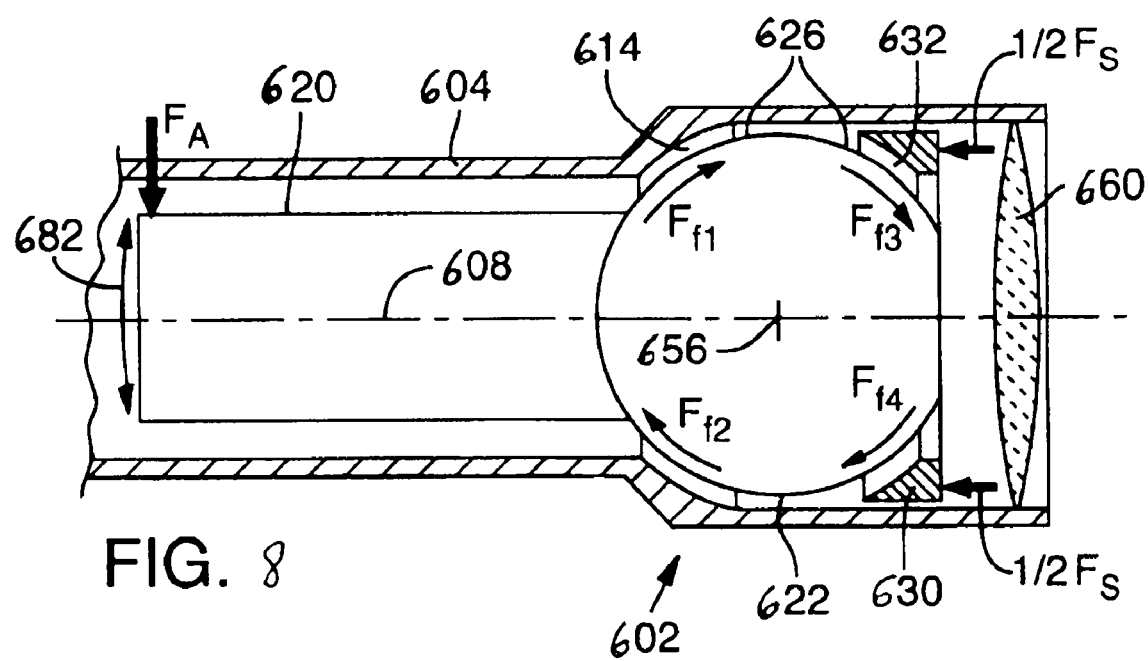

FIG. 6, is a partial cross sectional view of a riflescope 600, including a pivot mount 602. FIG. 7 is an enlarged cross sectional view of a portion of FIG. 6 showing in detail pivot mount 602. FIG. 8 is a schematic cross sectional view of riflescope 600. With reference to FIGS. 6-8, riflescope 600 includes a tubular housing 604 having a bore 606 that extends along a longitudinal axis 608 of housing 604. A half-socket sleeve 610 having a fixed socket surface 614 is inserted within bore 606 and rigidly bonded or press-fit to an interior wall 616 of housing 604. Those skilled in the art will appreciate that fixed socket surface 614 could also be formed or machined directly in interior wall 616 of housing 604. A lens-holding pivot tube 620 mounted within bore 606 of housing 604 includes a pivot end 622 sized for a sliding fit against fixed socket surface 614 (fixed socket surface 614 and pivot end 622 are spaced apart in FIG. 8 for clarity). Pivot tube 620 extends from pivot end 622 along longitudinal axis 608 and terminates in a free end 624 that supports an erector lens assembly 625 medially of housing 604.

Fixed socket surface 614 is preferably frusto-conical in shape, while pivot end 622 is preferably frusto-spherical in shape to help keep pivot end 622 centered on longitudinal axis 608. However skilled persons will appreciate that other shapes may be used for socket and pivot surfaces while keeping within the scope of the present invention. As shown in FIG. 8, pivot end 622 may comprise a single ball-shaped mating surface 626 having an outer diameter that is substantially larger than the minor diameter of fixed socket surface 614. However, in place of ball-shaped mating surface 626, pivot end 622 preferably includes a first frusto-spherical pivot surface 626a positioned against fixed socket surface 614 and a second frusto-spherical pivot surface 626b spaced apart and facing away from first pivot surface 626a, as shown in FIGS. 6 and 7.

A movable socket ring 630 is slidably mounted within housing 604 for movement along longitudinal axis 608 and includes a frusto-conical movable socket surface 632 slidably abutting second pivot surface 626b. A resilient member, such as a wave spring 628 (FIG. 7), biases movable socket ring 630 against pivot end 622 in the direction shown by Fs (FIG. 8). A lock ring 642 is externally threaded to mate with interior threads in housing 604. Lock ring 642 is screwed into place to compress wave spring 628 so that the desired amount of spring force Fs (FIG. 8) is applied against movable socket ring 630. A wire reticle 650 is mounted to pivot end 622 in a focal plane of rifle scope 600 generally perpendicular to longitudinal axis 608 so that cross-hairs (not shown) of reticle 650 are centered at a pivot point 656 (FIG. 8) of pivot end 622. An eyepiece 660 is threaded onto the end of housing 604 and environmentally sealed to protect pivot mount 602 from dust and debris.

Erector lens assembly 625 is rigidly mounted to pivot tube 620 so that the optical power of riflescope 600 is fixed. Skilled persons will appreciate that a power-varying erector of a type described above could also be employed. In a variable-power riflescope (not shown), erector lens assembly 625 would be slidably mounted within pivot tube 620. A cam sleeve (not shown) rotatably fitted around pivot tube 620 would drive erector lens assembly 625 for movement along pivot tube 620 generally along longitudinal axis 608, in response to manual rotation of a power-adjusting ring rotatably mounted around housing 604 and mechanically coupled to the cam sleeve.

A keyway slot 668 (FIG. 7) extends longitudinally along pivot end 622 and mates with a key 674 formed in the interior of housing 604 to orient pivot tube 620 in a generally fixed rotational position about the longitudinal axis 608 of housing 604 (some play is necessary to accommodate the motion of windage and holdover adjustments). In an alternative embodiment, the keyway slot and the key are interchanged so that keyway slot 668 extends longitudinally along the interior of housing 604 and mates with key 674 formed in pivot end 622 to orient pivot tube 620 in a generally fixed rotational position about the longitudinal axis 608 of housing 604. Fixing the rotational position of pivot tube 620 about longitudinal axis 608 of housing 604 facilitates the use of an optical power adjustment cam in an alternative variable-power riflescope.

A windage adjustment mechanism 680 is shown extending horizontally from housing 604 in FIG. 6 and includes a plunger 681 operatively engaged with free end 624 of pivot tube 620. Windage adjustment mechanism 680 adjustably extends into bore 606 and is manually adjustable to drive pivot tube 620 for movement transversely of longitudinal axis 608 in the direction indicated by arrows 682. Skilled persons will appreciate that an elevation adjustment mechanism (not shown) could also be applied to adjust the vertical position of pivot tube 620 in a direction perpendicular to windage adjustment mechanism 680. A leaf spring 684 connected to half-socket sleeve 610 biases free end 624 of pivot tube 620 toward windage adjustment mechanism 680 (and the elevation adjustment mechanism). A focus adjustment mechanism 690 is also shown.

In operation, adjustment of windage and/or holdover results in first lateral friction forces $F_{f1}$ and $F_{f2}$ (FIG. 8) generated at first pivot surface 626a and corresponding second friction forces $F_{f3}$ and $F_{f4}$ generated at second pivot surface 626b. The lateral components of first friction forces $F_{f1}$ and $F_{f2}$ are substantially equal and opposite of the lateral components of second friction forces $F_{f3}$ and $F_{f4}$ and thereby prevent the walking effect of prior art half-socket pivot mounts while keeping reticle 650 centered on longitudinal axis 608. Advantageously, pivot mount 602 requires less spring force $F_s$ to keep pivot end 622 centered on longitudinal axis 608 than is typically applied in prior art half-socket pivot mounts. Consequently, less adjusting force $F_A$ is required for making windage and holdover adjustments. Easier windage and holdover adjustment facilitates the precise adjustments desired by target shooting competitors. Reduced spring force also reduces wear at the interfaces between fixed and movable socket surfaces 614 and 632 and respective first and second pivot surfaces 626a and 626b, and helps maintain the accuracy of riflescope 600.

In most spotting scopes and some riflescopes, a prism erector system is used in place of a lens erector system. One such riflescope is the PRISMATIC riflescope sold by Leupold & Stevens, Inc., assignee of the present application. Another riflescope utilizing a prism erector is the Advanced Combat Optical Gunsight (ACOG) sold by Trijicon, Inc., of Wixom, Michigan, USA, which is substantially described by U.S. Pat. No. 4,806,007 of Bindon. The PRISMATIC and ACOG riflescopes are both fixed power sights, that is, they provide no zoom capability. The prism assembly of the ACOG is pivotably mounted for rotation about the effective focal plane of the sight's objective lens, for adjusting elevation and windage settings of the sight, as described in U.S. Pat. No. 4,806,007. Prism erectors may be smaller than lens erectors, and prism erectors typically are not moved along the optical axis of a sighting device, which eliminates or reduces the need for a mechanical device to translate the prism erector along the optical axis. Therefore, moving a prism erector laterally with respect to the optical axis may provide a greater range of windage or elevation adjustment than moving a lens erector does.

FIG. 2 illustrates an embodiment including a prism erector assembly 210 (schematically illustrated) that is moved laterally to adjust elevation and windage for a sighting device 100. In contrast to prior art riflescopes which provide zoom capability or a relatively large amount of lateral movement for windage and elevation adjustment, the embodiment of FIG. 2 preferably provides zoom capability and a relatively high amount of lateral movement for adjusting windage and elevation.

For windage and elevation adjustments, a prism erector assembly may be translated laterally (vertically and horizontally) or rotated about vertical and horizontal axes to shift the position of the image with respect to a reticle, for example. An erector adjustment mechanism is preferably mechanically coupled to a sighting device and to an erector assembly so that movement of at least a portion of the erector adjustment mechanism causes lateral movement of the erector assembly.

One exemplary erector assembly adjustment mechanism 215 is illustrated in FIG. 2. The prism erector assembly 210 is retained in the sighting device 100. A spring 212 biases the prism erector assembly 210 towards the erector assembly adjustment mechanism 215. The erector assembly adjustment mechanism 215 includes a knob 220 that is mechanically coupled to a pin 225 so that rotation of the knob 220 adjusts how far the pin 225 protrudes into the sighting device 100. The pin 225 is mechanically coupled to the prism erector assembly 210. For example, the pin 225 may include a ball at the end that meets the prism erector assembly 210 and the prism erector assembly 210 may include a socket joint for receiving the ball. Thus, adjusting the protrusion of the pin 225 into the sighting device 100 drives the prism erector assembly 210 for movement transverse to the optical axis 205 to adjust elevation for the sighting device 100. A second erector assembly adjustment mechanism offset by 90 degrees from the erector assembly adjustment mechanism 215 could be included to adjust windage for the optical sighting device 100. Alternatively, the prism erector assembly 210, or one or both of lens erector systems 105 and 110, or all three, can be mounted in a pivot tube for lateral movement to adjust elevation and windage, as in conventional riflescopes.

The use of multiple variable-power lens erector systems (i.e., lens erector systems 105 and 110) in conjunction with prism erector assembly 210 enables sighting device 100 to achieve a greater range of zoom than conventional riflescopes and other sighting devices while maintaining an acceptable length for a sighting device. Because three erector systems are utilized in the described sighting devices 10 and 100, erect images are produced. However, sighting devices are not limited to the configurations shown in FIGS. 1 and 2. For example, a prism erector assembly may be located between a first lens erector system and a second lens erector system, either before or after a second focal plane. Alternatively, a prism erector assembly may be located between a second lens erector system and an ocular, again, on either side of a third focal plane.

In another embodiment, the prism erector assembly may be replaced by a third power-varying lens erector system. A sight with three lens erector systems may be capable of achieving a zoom ratio greater than with two lens erectors and a prism erector system. For example, a sight including three lens erector systems each having a 3:1 zoom ratio could be configured to have a total zoom ratio of 27:1. In principle, a sight having any number of multiple power-varying erector lens systems could be arranged with adjacent pairs of erector systems sharing a common conjugate, to thereby achieve increased zoom. A sight having an odd number of erector systems (e.g., 3, 5, 7) will produce an erect image. Though a greater number of lens erector systems will increase image aberrations, the configurations of FIGS. 1 and 2 (with two lens erectors and one prism erector) should provide a good balance of high zoom capability and image quality.

It will be obvious to those having skill in the art that many changes may be made to the details of the above-described embodiments without departing from the underlying principles of the invention. The scope of the present invention should, therefore, be determined only by the following claims.

The invention claimed is:

1. An optical sighting device comprising:
 a housing;
 an objective mechanically coupled to the housing;
 an ocular mechanically coupled to the housing;
 a first erector assembly mechanically coupled to the housing between the objective and the ocular;
 a second erector assembly mechanically coupled to the housing between the first erector assembly and the ocular;
 a third erector assembly mechanically coupled to the housing between the second erector assembly and the ocular,
 wherein the third erector assembly includes a first moveable lens for adjusting magnification of an image viewed through the optical sighting device; and
 a power selector mechanically coupled to the housing and to the third erector assembly in a manner permitting movement of the power selector to cause movement of the first moveable lens.

2. An optical sighting device according to claim 1, wherein:
 the second erector assembly includes a second moveable lens for adjusting magnification of an image viewed through the optical sighting device; and
 the power selector is mechanically coupled to the second erector assembly in a manner permitting movement of the power selector to cause movement of the second moveable lens in the second erector assembly and movement of the first moveable lens in the third erector assembly at substantially the same time.

3. An optical sighting device according to claim 1, wherein:
 the second erector assembly includes a second moveable lens for adjusting magnification of an image viewed through the optical sighting device, further comprising:
 a second power selector mechanically coupled to the housing and to the second erector assembly in a manner permitting movement of the second power selector to cause movement of the second moveable lens of the second erector assembly.

4. An optical sighting device according to claim 3, wherein the first erector assembly includes a prism for inverting an image transmitted through the objective, and wherein the first erector assembly is further mechanically coupled to the housing in a manner permitting the first erector assembly to move with respect to the housing; and further comprising:
 an erector assembly adjustment mechanism mechanically coupled to the housing and to the first erector assembly in a manner permitting movement of the erector assembly adjustment mechanism to move the first erector assembly.

5. An optical sighting device according to claim 4, wherein movement of the erector assembly adjustment mechanism pivots the first erector assembly.

6. An optical sighting device according to claim 1, wherein:
 the second erector assembly includes a second moveable lens for adjusting magnification of an image viewed through the optical sighting device, and wherein the first erector assembly includes a third moveable lens for adjusting magnification of an image viewed through the optical sighting device, further comprising:
 a second power selector mechanically coupled to the housing and to the second erector assembly in a manner permitting movement of the second power selector to cause movement of the second moveable lens of the second erector assembly; and
 a third power selector mechanically coupled to the housing and to the first erector assembly in a manner permitting movement of the third power selector to cause movement of the third moveable lens of the first erector assembly.

7. An optical sighting device according to claim 1, wherein:
 the first erector assembly is located between the objective and a first focal plane that is associated with the objective;
 wherein a front conjugate of the second erector assembly approximately coincides with the first focal plane;
 wherein a rear conjugate of the second erector assembly defines a second focal plane and approximately coincides with a front conjugate of the third erector assembly; and wherein a rear conjugate of the third erector assembly approximately defines a third focal plane.

8. An optical sighting device according to claim 7, further comprising a reticle mechanically coupled to the housing proximate one of the first, second, or third focal planes.

9. A method for adjusting the magnification of an optical sighting device comprising:
   manipulating an optical power selector to move a first focusing lens and a first magnifying lens of a first erector assembly along a common optical axis and to move a second focusing lens and a second magnifying lens of a second erector assembly along the common optical axis;
   wherein the first erector assembly receives an image of an object and re-orients the image by inverting the image and flipping the image left-to-right with respect to the received image;
   wherein the second erector assembly receives the image of an object from the first erector assembly and re-orients the image by inverting the image and flipping the image left-to-right with respect to the received image; and
   wherein the first focusing lens, the first magnifying lens, the second focusing lens, and the second magnifying lens lie on the common optical axis and maintain a common conjugate for the first erector assembly and for the second erector assembly.

10. A method for adjusting the magnification of an optical sighting device according to claim 9, wherein manipulating the optical power selector to move the first focusing lens and the first magnifying lens and to move the second focusing lens and the second magnifying lens substantially simultaneously moves the first focusing lens and the first magnifying lens and the second focusing lens and the second magnifying lens.

11. A method for adjusting the magnification of an optical sighting device according to claim 9, wherein manipulating the optical power selector to move the first focusing lens and the first magnifying lens and to move the second focusing lens and the second magnifying lens adjusts the position of the first focusing lens and the position of the first magnifying lens for the first erector assembly before adjusting the position of the second focusing lens and the position of the second magnifying lens for the second erector assembly.

12. A method of making an optical sighting device comprising:
   providing an elongate housing having a central axis;
   mechanically coupling an objective to the elongate housing in a position where an optical axis of the objective is substantially parallel with the central axis such that the objective forms a first image of an object viewed through the optical sighting device wherein the first image is inverted and flipped left-to-right with respect to an orientation of the object;
   mechanically coupling a first erector assembly to the elongate housing in a position where the first erector assembly receives light passing through the objective such that the first erector assembly re-orients the first image to form a second image of the object wherein the second image is oriented the same as the orientation of the object;
   mechanically coupling a second erector assembly to the elongate housing in a position where the second erector assembly receives light passing through the first erector assembly such that the second erector assembly re-orients the second image to form a third image of the object wherein the third image is inverted and flipped left-to-right with respect to the orientation of the object;
   mechanically coupling a third erector assembly to the elongate housing in a position where the third erector assembly receives light passing through the second erector assembly such that the third erector assembly re-orients the second image to form a fourth image of the object wherein the fourth image is oriented the same as the orientation of the object;
   wherein the third erector assembly includes a lens erector system;
   mechanically coupling a power selector to the elongate housing and to the third erector assembly such that the lenses of the third erector assembly move in response to moving the power selector, to thereby continuously adjust an optical power of the optical sighting device; and
   mechanically coupling an ocular to the elongate housing in a position where an optical axis of the ocular is substantially parallel with the central axis.

13. A method of making an optical sighting device according to claim 12, wherein the second erector assembly includes a lens erector system, and further comprising:
   mechanically coupling a second power selector to the elongate housing and to the second erector assembly such that the lenses of the second erector assembly move in response to moving the second power selector, to thereby continuously adjust the optical power of the optical sighting device.

14. A method of making an optical sighting device according to claim 12, wherein the first erector assembly includes a prism erector system, and further comprising:
   mechanically coupling a reticle to the elongate housing between the objective and the ocular; and
   mechanically coupling an adjustment mechanism to the elongate housing and to the first erector assembly to move the first erector assembly with respect to the elongate housing in response to moving the adjustment mechanism.

15. A method of making an optical sighting device according to claim 12, wherein the second erector assembly includes a lens erector system, and-further comprising:
   mechanically coupling the third erector assembly to the second erector assembly to move the lenses of the second erector assembly in response to moving the lenses of the third erector assembly.

16. A method of making an optical sighting device according to claim 12, wherein the second erector assembly includes a lens erector system, and further comprising:
   mechanically coupling the power selector to the second erector assembly to move the lenses of the third and second erector assemblies in response to moving the power selector.

17. A method of making an optical sighting device according to claim 16, wherein the first erector assembly includes a prism erector system, and further comprising:
   mechanically coupling a reticle to the elongate housing between the objective and the ocular; and
   mechanically coupling an adjustment mechanism to the elongate housing and to the first erector assembly to provide movement of the first erector assembly with respect to the elongate housing.

18. A method for adjusting the magnification of a riflescope comprising:
   manipulating a first optical power selector mechanically linked to the riflescope to adjust a position of optical elements of a first erector assembly without adjusting a position of optical elements of a second erector assembly; and
   manipulating a second optical power selector that is different from the first optical power selector and mechanically linked to the riflescope to adjust a position of optical elements of the second erector assembly without adjusting a position of optical elements of the first erector assembly;

wherein the position of optical elements for the first erector assembly and the position of optical elements for the second erector assembly lie on a common optical axis and maintain a common conjugate for the first erector assembly and for the second erector assembly.

* * * * *